(12) United States Patent  (10) Patent No.: US 9,012,808 B2
Artelsmair et al.  (45) Date of Patent: Apr. 21, 2015

(54) METHOD FOR CONTROLLING AND/OR REGULATING A WELDING APPARATUS, AND WELDING APPARATUS

(75) Inventors: Josef Artelsmair, Wartberg/Krems (AT); Gerald Bart, Linz (AT)

(73) Assignee: Fronius International GmbH, Pettenbach (AT)

( * ) Notice: Subject to any disclaimer, the term of this patent is extended or adjusted under 35 U.S.C. 154(b) by 866 days.

(21) Appl. No.: 11/883,497

(22) PCT Filed: Feb. 21, 2006

(86) PCT No.: PCT/AT2006/000066
§ 371 (c)(1),
(2), (4) Date: Aug. 1, 2007

(87) PCT Pub. No.: WO2006/089322
PCT Pub. Date: Aug. 31, 2006

(65) Prior Publication Data
US 2008/0156781 A1  Jul. 3, 2008

(30) Foreign Application Priority Data

Feb. 25, 2005 (AT) .................................. A 329/2005

(51) Int. Cl.
*B23K 9/09* (2006.01)
*B23K 9/073* (2006.01)
(Continued)

(52) U.S. Cl.
CPC .............. *B23K 9/0737* (2013.01); *B23K 9/092* (2013.01); *B23K 9/0953* (2013.01); *B23K 9/124* (2013.01)

(58) Field of Classification Search
USPC ............... 219/130.31, 130.5, 130.51, 137.71, 219/137 PS
See application file for complete search history.

(56) References Cited

U.S. PATENT DOCUMENTS 4,249,062 A    2/1981  Hozumi et al.
4,371,776 A *  2/1983  Winn ...................... 219/130.51
(Continued)

FOREIGN PATENT DOCUMENTS

DE  19 19 464   10/1969
DE  42 33 818   4/1994
(Continued)

OTHER PUBLICATIONS

International Search Report of PCT/AT2004/000364.
(Continued)

*Primary Examiner* — Brian Jennison
(74) *Attorney, Agent, or Firm* — Collard & Roe, P.C.

(57) ABSTRACT

A method for controlling and/or regulating a welding apparatus with a welding wire, wherein after ignition of an electric arc, a cold metal transfer welding process is conducted. For creating more various possibilities for controlling heat introduction into the work piece and/or for introducing filler material, it is provided that during at least some short-circuit phases, polarity of the welding current I and/or the welding voltage U is switched, wherein the amplitude of the welding current I and/or the welding voltage U is adjusted to a defined value so that melting-through of the welding wire and the short-circuit bridge, respectively, is prevented. There is also a safe re-ignition of the electric arc when lifting the welding wire off the work piece. It is also possible to reignite the electric arc only by the welding current I and/or the welding voltage U without any auxiliary voltage, at the end of the short-circuit phase or at the beginning of the electric-arc phase.

19 Claims, 5 Drawing Sheets

(51) Int. Cl.
    *B23K 9/095*   (2006.01)
    *B23K 9/12*    (2006.01)

(56) References Cited

U.S. PATENT DOCUMENTS

| | | | |
|---|---|---|---|
| 4,485,293 A * | 11/1984 | Tabata et al. | 219/130.31 |
| 4,533,817 A | 8/1985 | Makimaa et al. | |
| 5,225,660 A | 7/1993 | Mita et al. | |
| 5,317,116 A | 5/1994 | Tabata et al. | |
| 5,726,419 A | 3/1998 | Tabata et al. | |
| 6,160,241 A * | 12/2000 | Stava et al. | 219/130.21 |
| 6,274,845 B1 * | 8/2001 | Stava et al. | 219/125.12 |
| 2001/0009252 A1 * | 7/2001 | Hiraoka et al. | 219/125.12 |
| 2004/0016788 A1 * | 1/2004 | Huismann et al. | 226/115 |
| 2005/0127054 A1 * | 6/2005 | Houston et al. | 219/130.51 |
| 2005/0242076 A1 * | 11/2005 | Stava et al. | 219/130.5 |

FOREIGN PATENT DOCUMENTS

| | | |
|---|---|---|
| DE | 197 38 785 | 4/1999 |
| EP | 0 774 317 | 5/1997 |
| EP | 1 384 546 | 1/2004 |
| EP | 1 384 547 | 1/2004 |
| EP | 1 384 548 | 1/2004 |
| EP | 1 384 549 | 1/2004 |
| GB | 1 245 589 | 9/1971 |
| JP | 57-168776 | 10/1982 |
| JP | 58-038665 | 3/1983 |
| JP | 60-187468 | 9/1985 |
| JP | 63-157765 | 6/1988 |
| JP | 63-268571 | 11/1988 |
| JP | 04-270069 | 9/1992 |
| JP | 61-70538 | 6/1994 |
| JP | 09-108836 | 4/1997 |
| JP | 11-058012 | 3/1999 |
| JP | 11-138265 | 5/1999 |
| SU | 1 299 730 | 3/1987 |
| WO | WO 00/64620 | 11/2000 |

OTHER PUBLICATIONS

Japanese Examination Report dated Nov. 16, 2010 with English explanation of Office Action.
International Search Report, May 11, 2006.
Kim, Tae-Jin et al., "Development of a power suppy for the pulse MIG arc welding with the changes of output current polarity," The 30$^{th}$ Annual Conference of the IEEE Industrial Electronics Society, 2004, pp. 953-956. (Austrian SR).

* cited by examiner

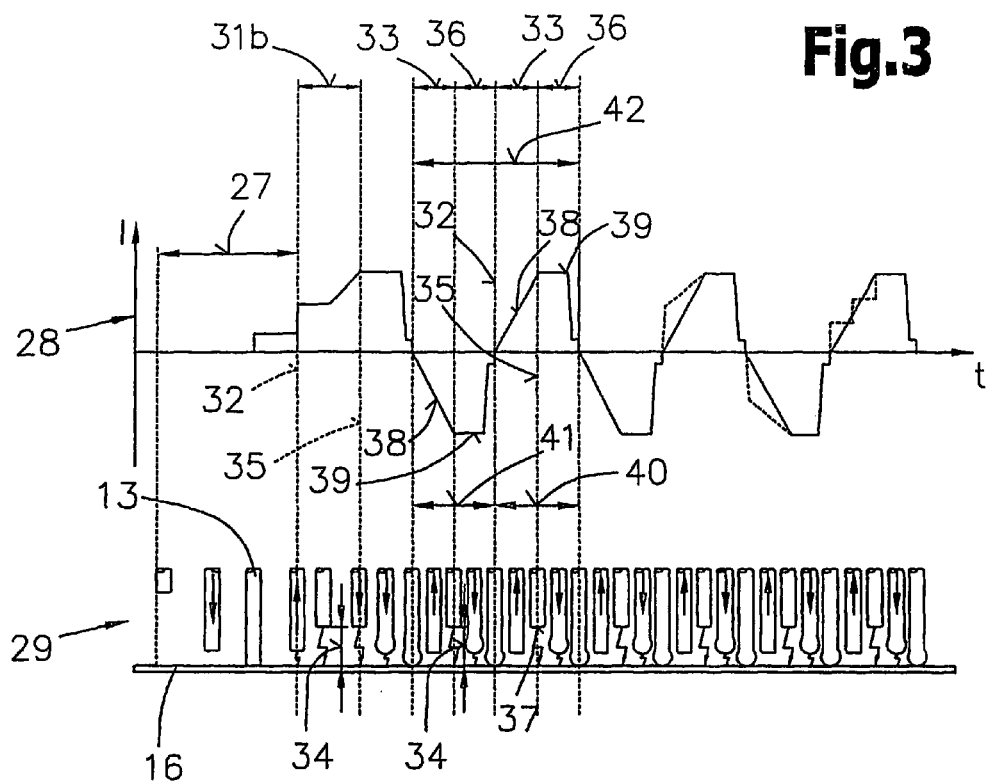
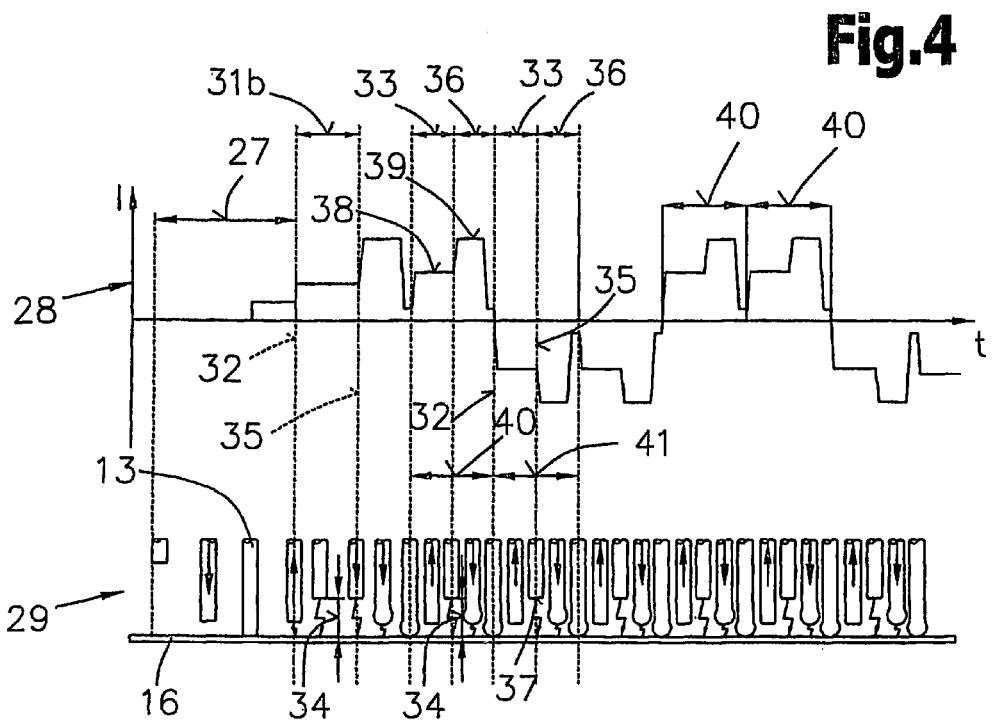

METHOD FOR CONTROLLING AND/OR REGULATING A WELDING APPARATUS, AND WELDING APPARATUS

CROSS REFERENCE TO RELATED APPLICATIONS

Applicants claim priority under 35 U.S.C. §119 of Austrian Application No. A 329/2005 filed Feb. 25, 2005. Applicants also claim priority under 35 U.S.C. §365 of PCT/AT2006/000066 filed Feb. 21, 2006. The international application under PCT article 21(2) was not published in English.

The invention relates to a method for controlling and/or regulating a welding apparatus and a welding current source, respectively, with a consumable electrode and a welding wire, respectively, wherein after ignition of an electric arc, a cold metal transfer (CMT) welding process is conducted, in which the welding wire is conveyed into the direction of the work piece until the former contacts the work piece, subsequently, after formation of a short circuit, during a short-circuit phase, the wire-conveying direction is reversed and the welding wire is moved away from the welding piece until opening of the short circuit, wherein the current flow for the welding current and/or the welding voltage is regulated such that the welding wire melts on, i.e. a drop formation occurs, during an electric-arc phase.

Furthermore, the invention relates to a welding apparatus with a welding-current source, a control device and a welding torch, further including an input and/or output device and/or a remote control for adjusting the different welding parameters and for adjusting and selecting at least one parameter for heat balance or heat introduction into the work piece to be processed.

A method for controlling a welding-current source is known from EP 1 384 546 A2, wherein the wave form of the welding current comprises at least one electric arc and/or ARC portion and a short-circuit portion. During the welding process, a short-circuit phase is introduced by moving the welding wire forward until it contacts the work piece, and an electric-arc phase is introduced by pulling the welding wire back. The short-circuit portion of the welding wire is applied during the short-circuit phase, before the welding wire is lifted off the work piece for forming an electric arc. In this context, the short-circuit portion has the current maximum in a period of the welding current so that high current flows via the welding wire and work piece in the short-circuit phase. The ARC portion of the welding current which is lower in terms of amounts is applied when the electrode is pulled back under formation of the electric arc. Thus, the wave form of the welding current is coordinated with the backward movement of the welding wire, wherein the wave form of the welding current has several different phases.

In this document, the disadvantage is that all possible welding methods are indicated, yet without describing in any way how these welding methods can be used with respect to moving the welding wire.

Furthermore, a welding-current source being part of the prior art is known from EP 1 384 547 A2. A method and a device for conveying a welding wire is known from EP 1 384 548 A1. A wire-conveying device is known from EP 1 384 549 A2.

With the methods and devices known from the prior art it has proven to be disadvantageous that controlling and regulating heat introduction into the welding process is possible to a limited extent only. There is a considerable heat introduction in the region of the welding spot of the work piece, since the welding current must be kept at a certain level at each point in time of the welding process so that the electric arc will not be extinguished. The work piece is strongly heated up in the region of the welding spot by the strength of current applied, this having negative effects on the welded joint particularly in the short-circuit phase, since in this phase the short-circuit portion of the welding current which is higher in terms of amounts applies. Thus, the possibilities for controlling heat introduction, particularly heat reduction, during a welding process are limited in the methods known. This results in the disadvantage that thin metal sheets, e.g., with a thickness of in the region between a few millimeters or decimillimeters and/or materials with a low melting point, such as, e.g. aluminum alloys, can either be welded only badly or not at all.

The object of the present invention resides in creating a method for controlling and/or regulating a welding process and a welding current source, which method allows for more various possibilities for controlling heat introduction into the work piece and introduction of filler materials, and which can be extended with the field of application of the welding process and a welding apparatus, and wherein the welding process can be designed in a more flexible manner. In particular, the heat energy which emerges during the welding process is to be reduced.

A further object resides in creating an above-mentioned welding apparatus, with which heat introduction into the work piece and introduction of filler materials can be rendered possible in a flexible manner and, thus, the field of application can be extended.

In terms of the method, the inventive object is achieved in that during at least some short-circuit phases of the welding process, polarity of the welding current I and/or the welding voltage U is adjusted to a defined value so that melting-through of the welding wire and the short-circuit bridge, respectively, is prevented, a safe re-ignition of the electric arc when lifting the welding wire off the work piece, however, being rendered possible by re-igniting the electric arc only by the welding current I and/or the welding voltage U without any auxiliary voltage, at the end of the short-circuit phase or at the beginning of the electric-arc phase. In this context, it is advantageous that heat input into the work piece to be welded, and/or the amount of the filler material to be introduced, into the melting bath can be controlled by changing polarity of the welding current I, particularly at constant welding current level. In particular, the heat input can be reduced to a minimum, if need be, so that work pieces of small wall thickness, e.g. thin metal sheets, and/or of low melting point materials or metal alloys, e.g. aluminum, can be welded or soldered up. This is possible thanks to the substantially currentless transfer of the filler material to the work piece, which occurs at the point in time of pole reversal of the current. A further advantage is that pole reversal of the current flow is coordinated with the movement of the welding wire. The poles of the welding current are changed during the short circuit, i.e. when the welding wire contacts the work piece, whereby no additional auxiliary voltage source is required for a new ignition of the electric arc, as would be required with a pole reversal during an electric-arc burning phase. This is possible in so far as no protective gas column to be ionized, i.e. no electric arc, is present in the short circuit phase, wherein the electric arc is ignited when the welding wire is lifted off by the welding current, which is adjusted and/or limited to a defined level, by the special wave form of the welding current and/or welding voltage. Since no auxiliary voltage source is needed, a cost-effective and simple structure of the welding apparatus is rendered possible.

In one embodiment of the invention, the welding current I during the electric-arc phase is increased to create a melting-on of the end of the welding wire. Due to this measure, a safe drop formation by melting-on of the welding wire is achieved. Furthermore, the melt-off volume of the filler material, i.e. the drop size, can advantageously be determined by the current strength applied in the electric-arc phase, if need be.

In another embodiment of the invention, the welding current I is increased during the short-circuit phase, and the filler material formed by the welding wire is introduced into the melting bath of the work piece. During a step of reducing the welding wire I, less filler material is introduced into the melting bath of the work piece. This measure is also advantageous, since the amount of the filler material for drop formation can thereby also be influenced. For example, with more current applied during the short-circuit phase in the electric-arc burning phase following thereupon, a larger molten drop is formed with the same electric arc current, whereby a larger amount of filler material can be introduced into the melting bath in the short-circuit phase following thereupon. This effect is particularly strong with filler materials with high specific resistance.

In another embodiment of the invention, the reversal of the direction of the welding wire occurs after formation of a short circuit, the wire-conveying direction is reversed and the welding wire is moved away from the work piece until there is a freely selectable or predefined distance. This measure allows for a reliable drop separation by directly contacting the work piece at, at the same time, low and/or no welding current applied, thus avoiding spatter formation.

In another embodiment of the invention, the polarity of the welding current I or the welding voltage U is switched after several periods with each period formed by one short-circuit phase and one electric-arc phase. This feature is also advantageous, since heat input and/or the amount of the filler material introduced can thereby be changed and controlled in many various ways, whereby the welding process can be used for the most different welding joints and material combinations and material thicknesses.

In another embodiment of the invention, the polarity of the welding current I or the welding voltage U is switched after a predefined or adjustable number of periods. This feature is advantageous, since a periodically recurring wave form of the welding current causes little effort in terms of control, and with the welding process a welding joint of continuously constant quality can be produced in many cases.

In another embodiment of the invention, the polarity of the welding current I or the welding voltage U is switched periodically or irregularly after a changeable or variable number of periods. This feature is advantageous, since, by irregular reversal of the polarity of the welding current, regulation of the welding process can additionally be flexibilized and adaptability of the welding process can be improved in case of coincidental disturbances and/or disturbances occurring from time to time only and/or external impacts. For example, if need be, the control device can determine a reversal of the polarity of the welding current, in case the currently detected desired values for the welding process are not adhered to.

In another embodiment of the invention, the point in time of switching polarity of the welding current I or the welding voltage U is automatically determined on the basis of at least one welding-process parameter which has been adjusted prior to the welding process or detected during the same. Due to this feature, an automated and individual parameterization of a welding process is advantageously achieved.

In another embodiment of the invention, the welding parameter is manually selected and adjusted on the welding apparatus. This feature is also advantageous, since, thereby, the wave form of the welding current is independently adjusted on the basis of manually adjusted user settings and, thus, a simple use of the welding apparatus is ensured and user friendliness is substantially increased.

In another embodiment of the invention, switching polarity of the welding current I or the welding voltage U is triggered on the basis of a predefined period or by a trigger signal. These features are advantageous, since they allow also for the reversal of the polarity of the welding current to be externally controlled.

In another embodiment of the invention, the feed rate V of the welding wire is changed and determined on the basis of the polarity of the welding current I or the welding voltage U. This feature is also advantageous, since, for different polarities, different preset values for the speed of the wire feed rate and the process parameters defined by these values, such as melt-off rate of the filler material, can be adjusted or defined by the control device, respectively, whereby a substantially improved process stability is reached and the welding process can be conducted in a more variable way.

In other embodiments of the invention, the polarity of the welding current I or the welding voltage is at least twice controlledly switched, wherein, in particular, a polarity change occurs during the electric-arc phase and during the short-circuit phase on the basis of welding-process parameters. These features are also advantageous, since they allow for the polarity switch of the welding current also in the electric-arc phase, whereby the parameters can be adapted even better to the welding task. Thus, the welding process can be optimized even more exactly for different cases of application.

In other embodiments of the invention, the amplitude or polarity of the welding current I or the welding voltage U is regulated on the basis of a width or a height of a gap detected between the work pieces to be welded, or on the basis of a depth of the weld penetration detected. These features are advantageous, since, thereby, an improved gap bridgeability and/or a better weld penetration is achieved, whereby, in particular, tolerances in the work pieces to be welded can be compensated.

The object according to the invention is achieved by an above-mentioned welding apparatus, wherein a control means is associated to the input and/or output device and/or to the remote control, said means being designed for defining the points in time of a polarity change of the welding current I and/or the welding voltage U, on the basis of the at least one adjusted or selected parameter for heat balance or heat introduction. This involves the advantage that introduction of heat energy and/or the filler material can be adjusted very exactly and very individually to the present welding case by the control means of the above described design by determining polarity of the welding current, depending on the point in time. Further advantages of the adjustment-depending polarity change of the welding current can be gathered from the above and below-mentioned description.

According to further embodiments of the invention, advantageous designs of a welding apparatus are described, with which a welding process as a whole can be improved and the structure of the welding apparatus can be designed to be simple and maintenance friendly, e.g. by the possibility of conducting software updates.

The present invention will be explained in more detail by way of the accompanying schematic drawings. Therein:

FIG. 3 shows the variation in time of the welding current and the motion diagram for the welding wire during a second example of a welding process according to the invention;

FIG. 4 shows the variation in time of the welding current and the motion diagram for the welding wire during a third example of a welding process according to the invention;

Figure 1:
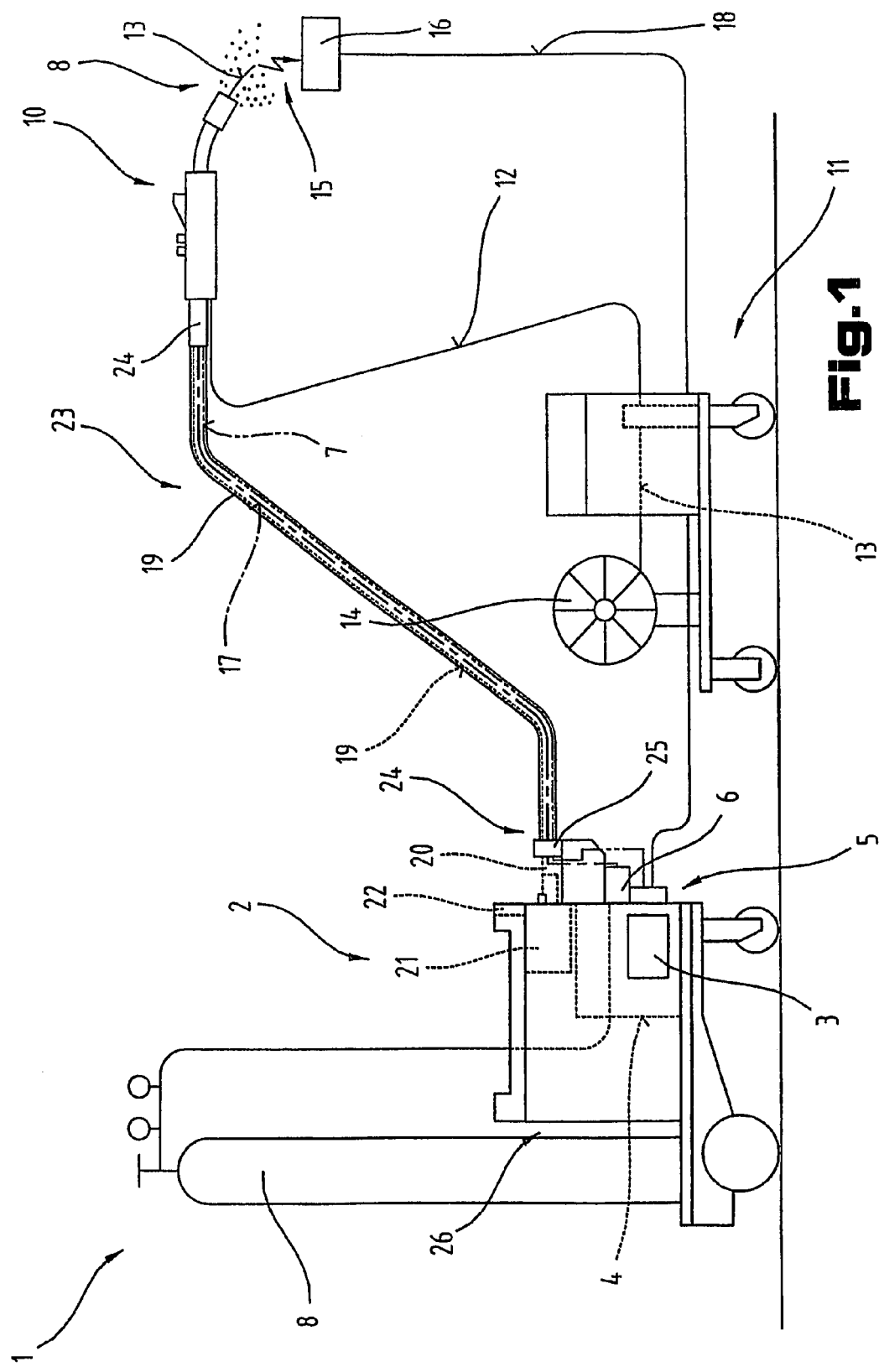
FIG. 1 shows a schematic illustration of a welding machine or a welding device.

In FIG. 1, there is shown a welding apparatus 1 or a welding plant, respectively, for the most different processes and methods with a consumable welding electrode, particularly a welding wire and a filler material, respectively, such as, e.g. MIG/MAG welding or electrode-welding methods, double-wire/tandem welding methods or soldering methods etc.

The welding apparatus 1 comprises a current source 2 with a power element 3, a control device 4 and a switch element 5 which is associated to the power element 3 and/or the control device 4. The switch element 5 and/or the control device 4 is connected with a control valve 6 which is arranged in a supply line 7 for a gas 8, particularly a protective gas, such as, e.g. $CO_2$, helium or argon and the like, between a gas storage 9 and a welding torch 10 or a burner, respectively.

Additionally, a wire feeding device 11 can, furthermore, be activated via the control device 4, which feeding device is particularly common for MIG/MAG welding, wherein a filler material and/or a welding wire 13 is supplied from a feed drum 14 or a wire coil into the region of the welding torch 10 via a supply line 12. Certainly, it is possible that the wire feeder 11, as known from the prior art, is integrated in the welding apparatus 1, particularly in the basic housing, and is not designed as accessory device, as illustrated in FIG. 1.

It is also possible that the wire feeder 11 supplies the welding wire 13 and/or the filler material outside of the welding torch 10 to the processing site. Furthermore, the wire feeder 11 may comprise different drive units, wherein a drive unit may be arranged, e.g. in the region of the welding-wire outlet, particularly in the welding torch 10 and/or of the welding spot on the work piece, and a further drive unit may be located in the region of the feed drum 14. A wire puffer may be provided between the drive units, which puffer, optionally, receives a variable length section of the welding wire 13, particularly when the welding wire 13 is to be conveyed back.

The welding current for establishing an electric arc 15, particularly an operating arc, between the electrode and a work piece 16 is supplied from the power element 3 of the current source 2 to the welding torch 10, particularly the electrode, via a welding line 17, wherein the work piece 16 to be welded which is particularly formed by several pieces is also connected with the welding apparatus 1, in particular with the current source 2, via a further welding line 18, and, thus, an electric circuit can be established via the electric arc 15 for a welding process.

For cooling the welding torch 10, the welding torch 10 can be connected with a liquid reservoir, particularly a water reservoir 21, via a cooling circuit 19, a flow controller 20 being interposed, whereby the cooling circuit 19, particularly a liquid pump to be used for the liquid present in the water reservoir 21 is started when the welding torch 10 is put into operation and, thus, cooling of the welding torch 10 can be effected.

The welding apparatus 1 can, furthermore, comprise an input and/or output device 22, via which the most different welding parameters, modes of operation or welding programs of the welding apparatus 1 can be set and called. In this context, the welding parameters, modes of operation or welding programs set via the input and/or output device 22 can be forwarded to the control device 4 and, thereafter, the individual components of the welding plant or the welding apparatus 1, respectively, are activated and the corresponding values desired for regulation or controlling are predetermined by said control device 4.

Moreover, in the exemplary embodiment illustrated, the welding torch 10 is connected with the welding apparatus 1 or the welding plant, respectively, via a hose package 23. In the hose package 23 the individual lines of the welding apparatus 1 to the welding torch 10 are arranged. The hose package 23 is connected with the welding torch 10 via a coupling device 24, whereas the individual lines in the hose package 23 are connected with the individual contacts of the welding torch 1 via female connectors and/or plug-in connections. To ensure an appropriate strain relief of the hose package 23, the hose package 23 is connected with a housing 26, particularly the basic housing of the welding apparatus 1, via a strain-relief device 25. Of course, it is possible to use the coupling device 24 for the connection on the welding torch 1 as well.

Basically, it has to be mentioned that not all above-mentioned components must be used and employed for the different welding methods or welding apparatuses 1, respectively, such as, e.g MIG/MAG devices. For example, it is also possible to design the welding torch 10 as air-cooled welding torch 10.

Figure 2:
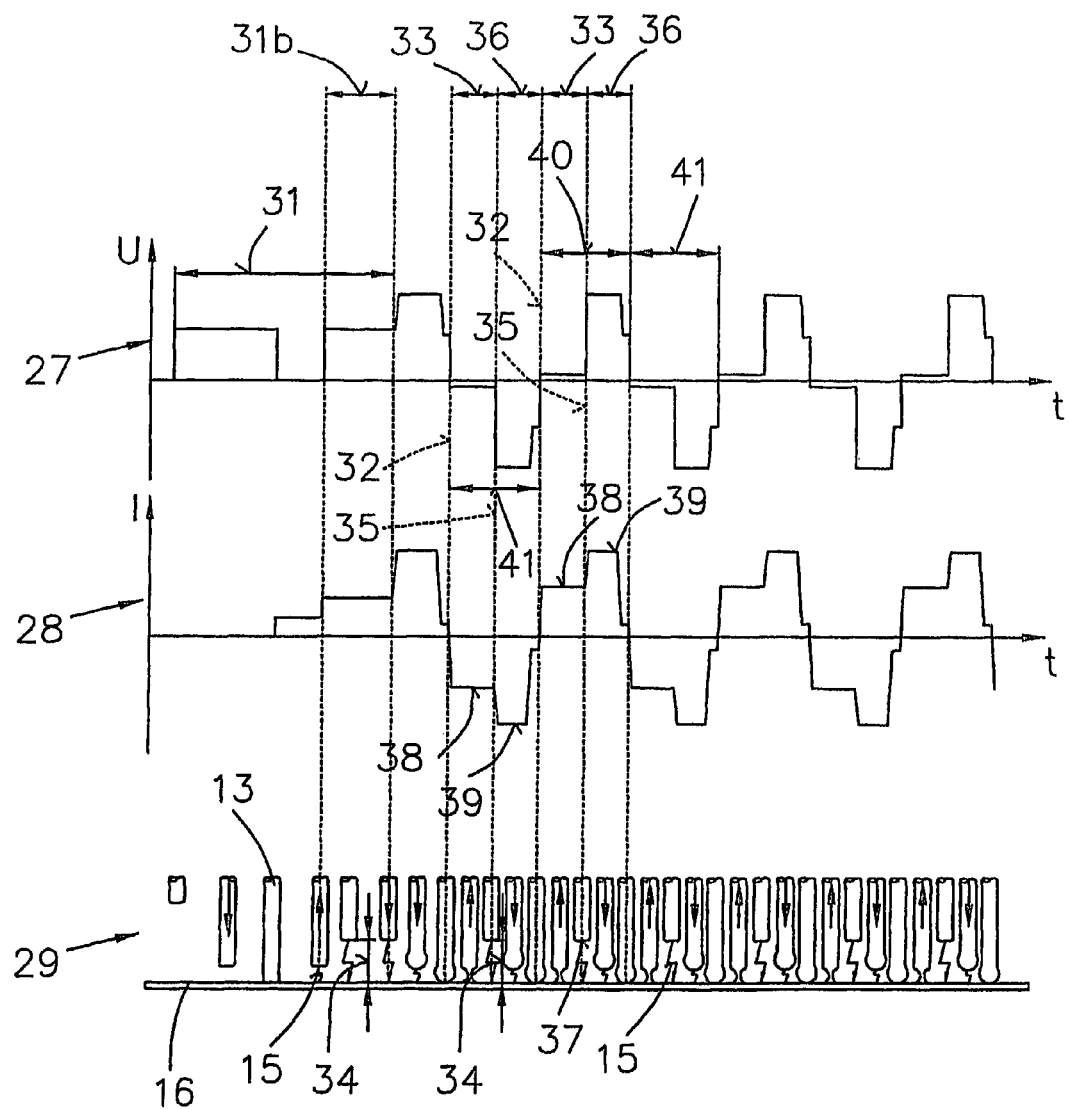
FIG. 2 shows the variation in time of the welding voltage, the welding current and a motion diagram for the welding wire during an example of a welding process according to the invention.

In FIG. 2, an exemplary embodiment of a welding process according to the invention is schematically illustrated by way of diagrams 27 to 29. Diagram 27 shows the variation in time of the welding voltage U, diagram 28 the variation in time of the welding current I and diagram 29 the motions and positions of the outlet-sided end of the welding wire 13 relative to the work piece 16. The histories show a method for controlling and/or regulating the welding apparatus 1 and/or the welding current source 2, with a consumable electrode and/or the welding wire 13. In this context, melting-on of the work piece 16 and the welding wire 13 is effected via the ionized plasma column and/or the electric arc 15 which is established between the welding wire 13 and the electrical antipole on the work piece 16.

Ignition of the electric arc 15 can be done by any method, e.g. by the lift arc principle known from the prior art, wherein an open-circuit voltage is applied on the welding wire 13 during an ignition phase 31, then, the welding wire 13 is moved forward until it contacts the work piece 16, whereupon the resulting short circuit is opened during a short-circuit phase by reversing the conveying direction of the welding wire 13, and an electric arc is established via the pathway the welding is conveyed back, until a new reversal of the wire conveying direction occurs so that the welding wire 13 is moved in the direction of the work piece 16. In the ignition phase 31 in one or several stage(s), the current I is limited such that no melting of the welding wire 13 can take place. In a further possible embodiment variant, the first ignition of the electric arc 15 can be done via a high-frequency voltage signal, a so-called high-frequency ignition.

After ignition of the electric arc 15, a first short process phase 31b with an increased energy input over a defined period can also be conducted prior to the welding process proper, and, subsequently, the welding process established by cyclically recurring welding process phases can be done. By this short process phase 31b with high energy input, stabilization of the electric arc 15 is achieved. Furthermore, the welding wire 13 is heated up by the ignition process and, thus, the subsequent welding process can start with a preheated welding wire 13, whereby welding quality is substantially improved.

After ignition phase 31 and/or the process phase 31b, the welding process proper occurs, wherein according to the invention a cold metal transfer (CMT) welding process is conducted. In the CMT process, the welding wire 13 is conveyed in the direction of the work piece 16 until it contacts the latter, whereupon after formation of a short circuit at point in time 32, the short circuit phase 33 starts, in which the wire-conveying direction is reversed. In the short phase 33, the welding wire 13 is moved away from the work piece 16 until the short circuit opens, i.e. the electric arc 15 forms, and/or until a defined distance 34 and/or a defined period is reached, whereupon, at point in time 35 the process phase herein termed electric arc phase 36 starts. In the electric arc phase 36 the welding wire 13 is melted on so that drops form at the end of the welding wire. The moving direction of the welding wire 13 is once more reversed at an upper dead point 37, whereupon the welding wire 13 is moved in the direction of the work piece 16. The welding current I and/or the welding voltage U is regulated in the electric arc phase 36 such that a melting-on of the welding wire 13, i.e. drop formation, occurs, yet without melting the welding wire 13 off.

The welding wire 13 moves in an oscillating way during the welding process. The wire feeder 11 is substantially clocked such that there is a negative signal and/or the welding wire 13 is conveyed back in the short circuit phase 33, in which an electric arc 15 is established, and that there is a positive signal and/or the welding wire 13 is conveyed forward in the direction of the work piece 16 in the electric-arc phase 36, in which the welding wire 13 is heated up and/or melted on for drop formation (cf. diagram 20 in FIG. 6). Clocking of the moving direction of the welding wire 13 must, however, not necessarily correlate with the occurrence of the electric-arc phase 36 and/or the short-circuit phase 33, since the electric-arc phase 36 can occur, e.g., already during the backward movement of the welding wire 13 by a specific energy input by regulating the current level in the welding cycle. I.e., when there already is an electric arc 15, the welding wire 13 can also still be moved away from the work piece 16 until a defined point in time and/or distance is reached. For example, the wire feeder 11 is activated by means of an oscillation frequency of the welding wire 13 of from 30 to 100 Hz, particularly about 50 to 70 Hz.

After the dead point 37 has been reached, the welding wire 13 is moved forward until it contacts the work piece 16, particularly a melting bath. Due to the surface tension of the drop on the welding wire 13 and/or further known physical effects effective on the liquid drop, the same is separated from the welding wire 13 and bound by the work piece 16, wherein this occurs free from welding spatters or other phenomena due to the lacking fall movement of the drop. Thereafter, the short-circuit phase 33 is again initiated, wherein the backward movement of the welding wire 13 favors drop separation. An increase, particularly an pulse-like increase, of the welding current I can be done in the short-circuit phase 33 for supporting drop separation. For the duration of the CMT process, the short-circuit phase 33 and the electric-arc phase 36 alternate each other periodically in the exemplary embodiment shown.

More detailed information in terms of method of the CMT process is now not given, since this process is already known from the prior art for welding processes with constant polarity on the welding wire 13 and/or the work piece 16.

According to the invention, in order to give more possibilities for influencing the welding process, it is now provided that during all or some of the short-circuit phases 33, polarity of the current flow, particularly the current I and the voltage U, is switched, wherein a defined amplitude for the current I is set so that the welding wire 13 and/or a short-circuit bridge is prevented from melting-through, a re-ignition of the electric arc 15, however, being safely effected when the welding wire 13 is lifted off the work piece 16.

As can be seen from FIG. 2, the welding current I has a wave form and/or an pulse sequence with a periodically changing polarity, wherein polarity during the regular welding process changes with each semi-period 40, 41 of the welding current I. The time of the period 40 of the current I with positive polarity substantially corresponds to the time of the period 41 of the current I with negative polarity.

Alternatively, the welding current I may comprise one at least temporarily aperiodically changing polarity. In this context, the amounts of time 40, 41 of the current I with positive and negative polarity are different over a certain period, as will be explained further below in more detail in the course of the description of FIG. 5.

The voltage U and/or the current I are raised to a first level when the point in time 32 is exceeded, which level ensures a safe re-ignition of the electric arc 15. Optionally, this level can be defined as operating level which is kept constant during the entire short-circuit phase 33 and the electric-arc phase 36. Preferably, a positive or a negative period and/or period section of the welding current I comprises, however, a first portion, the basic current 38, and at least one further portion, the operating current 39, as can be seen in diagram 38. In the exemplary embodiment shown the basic current 38 and the operating current 39 are constant. The basic current 38 and/or the operating current 39 can change in terms of time. In particular, the basic current 39 can increase in the timely course and/or the operating current 39 can decrease in the timely course.

The basic current 38 is preferably relatively small as compared with the operating current 39, wherein the operating current 39 can be, e.g. 1.5-fold to 10-fold, particularly 4-fold to 8-fold, higher than the basic current 38. The basic current 38 can be, e.g. 5 A to 50 A, particularly about 10 A to 30 A, and the operating current 39 can be, e.g. 50 A to 500 A.

According to the invention, a polarity is applied on the electrode and/or the welding wire 13 and the work piece 16, which polarity is at least temporarily changing or changed to a first polarity and is subsequently referred to as negative portion of the welding current I and indicated as negative period 41 of the welding current I in the Figures, said first polarity being subsequently referred to as positive portion of the welding current I and indicated as positive period 40 in the Figures. This negative portion of the current I allows for a plurality of control and/or regulation possibilities for the welding process by alternatingly applying the positive and negative portions of the welding current I. The negative portion of the welding current I forms an additional influencing factor in the welding process so that the energy balance can be determined very exactly and user-specifically when the properties of and the period of applying the positive and negative polarities of the welding current I on the work piece 16 and the electrode and/or the welding wire 13 are correspondingly adjusted. In this context, this control of the electrical energy supply is conducted by the control device 4.

Since the polarity of the welding current I is changed if need be, the temperature of the heat-affected zone on the work piece 16 is substantially reduced as compared to the welding process with constant polarity. On the one hand, this is achieved by the ideally currentless transfer of the filler material at the point in time 32, whereby at the time of drop separation, a cooling of the heat-affected parts, particularly the melting bath and the filler material, can occur. As compared to the CMT processes known from the prior art, in the present welding process, heat introduction can be reduced in a preferred manner since the welding current I is reduced at a constant melting-off volume in the negatively poled electric-arc phase 36. By reducing the heat input into the work piece 16, even thinner wall thicknesses and materials with lower melting temperatures can be welded.

If now the positive pole of the welding current I is applied on the welding wire 13, the electrode is more heated up than is the case with a negative polarity. This known effect results in that a larger material volume is melted on on the welding wire 13 with a positive polarity of the welding wire 13 than with a negative one. In case of a positive polarity of the work piece 16, more heat energy is introduced into the region of the welding spot on the work piece 16, whereby, compared to the opposite polarity, the heat-affected zone on the work piece is enlarged and/or the penetration depth in the work piece 16 is increased. The method according to the invention can specifically use these effects by controlling the polarity switching according to the needs or to the adjustments set by the current source 2.

According to the embodiment variant illustrated in FIG. 2, after a positive period 40 which includes a short-circuit phase 33 and an electric-arc phase 36, there follows a negative period 41 which also includes a short-circuit phase 33 and an electric-arc phase 36 which periodically follow each other in this order.

In an advantageous method variant, the welding current I is changed, particularly increased, in the electric-arc phase 36, whereby drop formation and/or melting-on of the welding wire 13 is achieved. In this context, the welding current I is increased to the above-mentioned operating current 39, preferably by the welding current 38 which is applied in the short-circuit phase 33. Furthermore, the welding current I is reduced to a smaller value prior to the short-circuit phase 33 of the welding wire 13, as is schematically illustrated, and/or is reduced to zero, in order to obtain a minimum of electric-arc pressure when the distance between the electrode and/or the welding wire 13 and the work piece 13 is reducing. Thus, a spatter-free transition from the electric-arc phase 36 to the short-circuit phase 33 is rendered possible.

FIG. 3 shows a further method variant, wherein the welding current I is changed in terms of time in the short-circuit phase 33. Diagram 28 shows the variation in time of the welding current I, and diagram 29 illustrates the variation in time of the movements and positions of the welding wire 13. In the following, the variation in time of the welding voltage U is not illustrated in order to safeguard the curve progression of the welding current I shown in diagram 29, since said voltage may have variable and/or different wave forms.

The basic current 38 applying in the short-circuit phase 33 is, e.g. constantly increased from the point in time 32, whereby in the short-circuit phase 33, the welding wire 13 is already considerably preheated or, if need be, melted on. The melting-off rate of the filler material can thus be increased. For example, a broader gap between the parts of the work piece 16 to be connected can thus be filled with filler material and bridged, what is particularly advantageous for connecting two parts via butt welds with large and/or irregular gap width.

The increase in the welding current I during the short-circuit phase 33 can be constant (solid lines), e.g. after a ramp function, or stepwise (dashed lines).

The feed rate of the welding wire 13 can also be defined during the different process phases on a predetermined constant value or is variably readjustable. The feed rate can depend on different process parameters, wherein regulation of the wire feeder 11 is preferably automatically done by the control device 4. For example, the feed rate is the higher the higher the welding current I is in the short-circuit phase 33 and/or the electric-arc phase 36. When the welding current I is changed, the feed rate is preferably adapted in a corresponding manner so that the desired values preset on the current source 2 and/or the control device 4 can be adhered to.

In FIG. 4 a further method variant is illustrated. Here, polarity switch of the welding current I occurs only in several short-circuit phases 33 of a welding process, preferably after a predetermined number of short-circuit phases 33 and electric-arc phases 36 with the same polarity of the welding current I. A short-circuit phase 33 and an electric-arc phase 36 form a period 40. As illustrated, the welding current I remains with the same polarity for two subsequent periods 40, whereupon a polarity change of the welding current I occurs. Then, the polarity of the welding current I is switched, again, after a predetermined number of periods 40. In the exemplary embodiment the number of positive periods 40 corresponds proportionally substantially to the number of negative periods 41 during the welding process.

Figure 5:
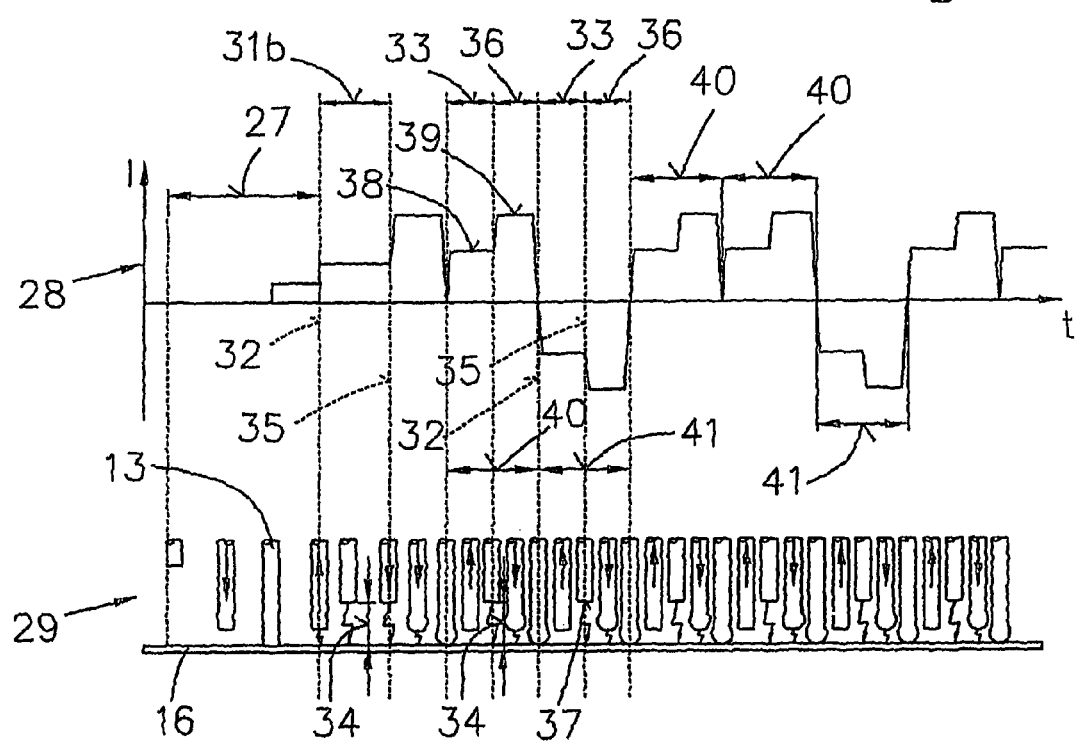
FIG. 5 shows the variation in time of the welding current and the motion diagram for the welding wire during a fourth example of a welding process according to the invention.

In FIG. 5, a further method variant is shown, wherein the polarity switch of the welding current I occurs after a number of periods 40 defined by the control device 4. In this context, the number of positive periods 40 does not correspond to the number of negative periods 41, during a welding process there are, e.g. proportionally more positive periods 40. The negative period 41 impacts on the welding process in so far as, due to the negative pole on the welding wire 13 or on the work piece 16, less heat is introduced and the thermal energy on the element influenced is reduced. The heat balance can be decisively influenced by the negative period 41. The wave form of the negative period 41 may correspond to the inverted positive period 40, or during the negative period 41, the welding current I is changed in the curve shape and/or changed in terms of amounts, particularly is higher or lower, as compared with the same during the positive period 40. For example, the welding current I can be selected to be lower at a constant melting-off rate of the welding wire 13, whereby less heat energy is introduced into the work piece 16 due to the lower welding current I.

It is possible that the control device 4 determines the polarity change of the welding current I irregularly or according to the needs. If, e.g., there is a too high melting-off volume of the welding wire 13 and/or if the heat introduction into the work piece 16 is too high, the control device 4 can detect this by means of corresponding sensors in a closed loop, whereupon a polarity switch of the welding current I is done for reducing temperature.

A further method variant not illustrated in detail is that a period 40; 41 of the welding current I has a shorter or longer period duration than the differently poled period 41; 40. For example, the period duration of the positive period 40 is shorter than the one of the negative period 41. Thus, the heat energy produced during the positive period 40 is adapted to the heat energy produced during the negative period 41, whereby a constant melting-off volume can be achieved on the welding wire 13 when the polarity of the welding current I is changing. Of course, there is also the possibility that the welding current I is changed, particularly increased, during the negative period 41 as compared to the current I during the positive period 40 so that variations in heat introduction in case of different polarities of the welding current I can be equalized.

Figure 6:
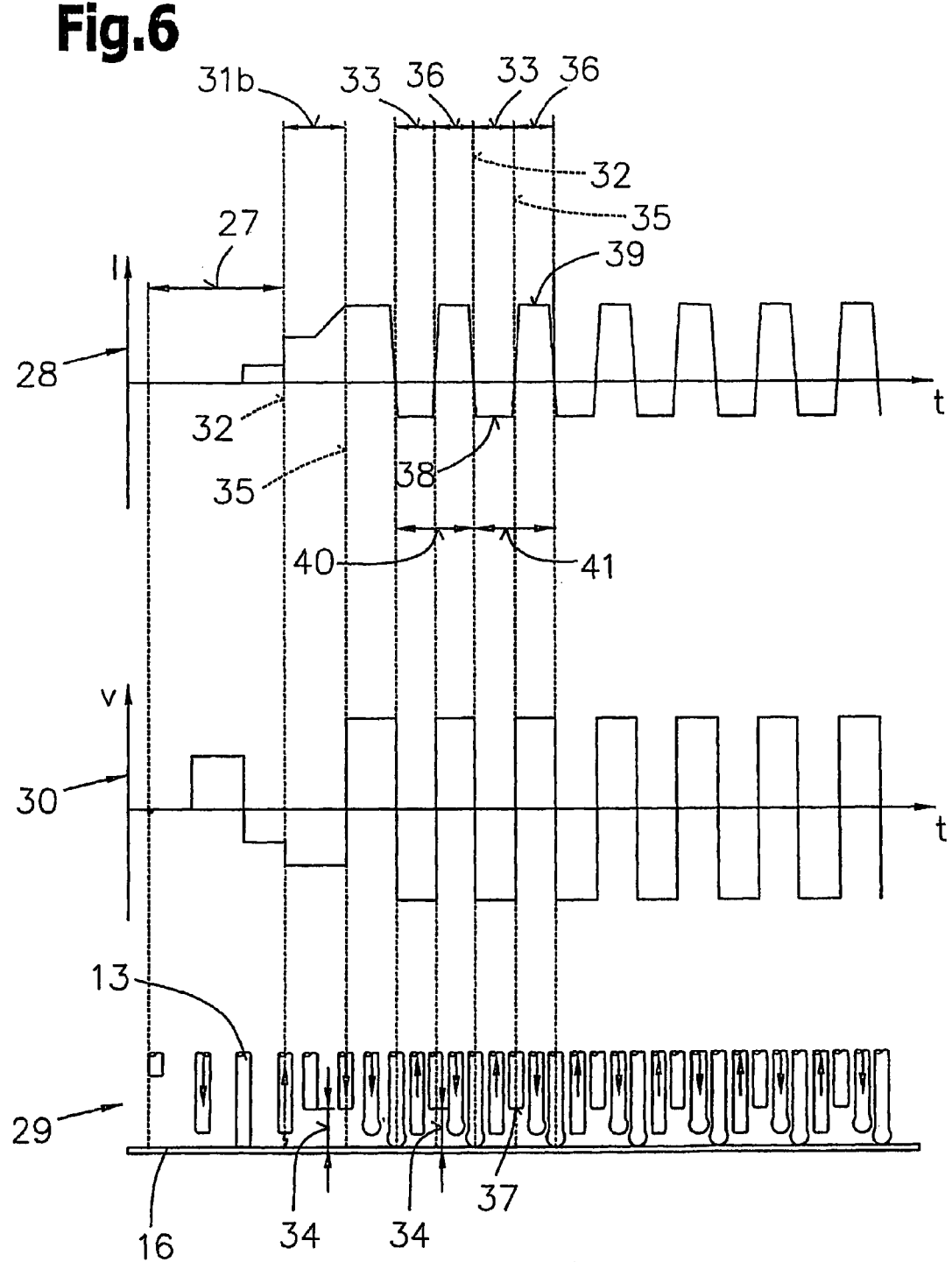
FIG. 6 shows the variation in time of the welding current, the motion diagram for the welding wire and the schematized variation in time of a control signal for the feed rate of the welding wire by way of a fifth example of a welding process according to the invention.

In FIG. 6 a further method variant is shown. Here, the polarity of the welding current I is changed at least twice during a period 40, 41. For example, the first polarity switch of the welding current I occurs in the short-circuit phase 33 and the second in the electric-arc phase 36. When the welding wire 13 moved backward in the short-circuit phase 33, the negative polarity of the welding current I, e.g., applies on the welding wire 13, wherein at the point in time 35 the polarity of welding current I changes, and in the electric-arc phase 36 the positive polarity of the welding current I is applied on the welding wire.

Such a procedure is advantageous as less heat energy emerges on the welding wire 13 during the short-circuit phase 33, and a high melting-off rate of the filler material can be achieved by the positive polarity of the welding wire 13 in the electric-arc phase 36, and less heat introduction into the work piece 16 can be reached by negative polarity of the work piece 16. If need be, polarity of the welding wire 13 and/or the work piece 16 can, certainly, be vice versa in order to optionally influence special welding processes in a positive way.

Generally, with respect to the embodiment variants described in FIGS. 2 to 6, it shall be noticed that the timely controlled polarity switch of the welding current I can be determined within a period based on parameters, such as, e.g. the parameter of heat introduction, the parameter of the welding current I, the parameter of welding voltage U, a parameter of material introduction and/or material filling, a parameter of the welding gap in the work piece 16, etc. For this purpose, detecting elements and/or sensors, adjusting elements, operator facilities and/or remote controls, data memories, control means, such as, e.g. a software and/or a program logic, etc., known from the prior art, can be assigned to the control device 4 so that the latter can correspondingly detect and determine desired values and/or correcting variables in the regulation process.

For example, a gap of the work pieces 16 to be welded is detected and according to the gap width and/or the gap height, the size and/or polarity of the welding current I is regulated. Moreover, the weld penetration depth, particularly the so-called welding root, can be detected and the polarity change of the welding current I can be correspondingly regulated.

It is also possible that there is an automatic regulation of the polarity change and/or of the number and/or of the duration of the individual periods 40, 41 of the welding current I by detecting the temperature of the work piece 16 and by presetting a defined heat introduction on the welding apparatus 1, for regulating the heat balance. There, the temperature detected of the work piece 16 is forwarded to the control device 4 of the welding apparatus 1, whereupon said device 4 determines whether the polarity and/or properties of the welding current I will be changed.

The welding apparatus 1 consists of a welding-current source and/or a current source 2, a control device 4 and a welding torch 10. The different welding parameters can be adjusted via the input and/or output device 22 on the welding apparatus or via a remote control. At least one parameter for the heat balance or heat introduction into the work piece to be processed can be selected on this input and/or output device 22 of the welding apparatus 1 and/or on a remote control, and/or an adjusting element for adjusting the heat balance and/or the heat introduction into the work piece to be processed can be arranged.

A control means is associated to the input and/or output device 22 or to the remote control, which means is designed for defining the points in time of a polarity change of the welding current I based on the adjustments of the heat balance and/or heat introduction. The curve form of the welding current is determined by the control means on the basis of the parameters for heat balance and/or heat introduction.

The parameters adjusted are forwarded to the control device 4 of the welding apparatus 1, whereupon said device controls and/or regulates an appropriate welding process. The most different parameters for the welding process, such as, e.g. the welding current I and/or the welding voltage U and/or the wire-conveying rate V and/or a welding parameter for heat introduction and/or the material of the work piece 16 to be welded and/or the material of the welding wire 13 and/or the welding gas to be used, can be adjusted in the input and/or output device 22.

The adjustments set can be seen on a display. In case of the input and/or output device 22 illustrated, the adjustment is done via selecting or adjusting means which can be formed by buttons, rotary-type switches or potentiometers. For example, the thickness of the welding current 13 can be adjusted by means of first buttons and the corresponding adjustment can be shown on a display. With a second arrangement of buttons, e.g. the material of the welding wire 13 can be selected, and the material combination adjusted can be shown on a further display. The type of welding process is adjusted via a third button combination by cyclically or acyclically changing polarity of the welding current I and is shown on a third display.

For example, frequency of the changing wire movement and/or zero crossing of the welding current I can be adjusted user-specifically in a direct manner or in an indirect manner via a parameter which is proportional to these parameters.

The heat balance and/or heat introduction into the work piece 16 can also be adjusted in such a way that the user sets a common welding process and determines the heat balance by additionally setting a further parameter, such as heat introduction which is shown on a display and selectable via buttons. Here, the user can determine by selection on the display in a simple manner whether, e.g. there should be a low, medium or high heat introduction so that the control device 4 effects an appropriate control and/or regulation. Data and/or calculation models corresponding to the individual selection possibilities are deposited in a memory so as to allow for an automatic determination.

For example, data, e.g. AC curve forms, current values, frequencies or the like, of the welding current I, or wire-motion paths and/or oscillation frequencies of the welding wire 13, can be deposited for the respective welding process in a memory which is integrated in the welding apparatus 1, according to which data the control device controls the welding method. Furthermore, a control means can be deposited in a preferably rewritable memory in the form of a software, which means is coupled with the input and/or output device 22 and/or the remote control in a way that they act on each other, and which determines particularly the polarity changes and the amplitudes of the welding current I.

Thus, only few adjustments have to be done by the user before the welding process, whereupon the control device 4 regulates the welding process automatically. In detail, heat balance and/or heat introduction into the work piece 16 is determined by selecting the material for the welding wire 13 and the work pieces 16 to be welded. In this context, corresponding values can be deposited in the memory for the most different materials for the welding wire 13 and the work pieces 16 so that, depending on the material selected, the relation of the alternating phases of the welding process is defined by the control device 4. For example, less heat introduction into the work piece 16 is required for a welding process with aluminum than for welding process with steel. Thus, different values are deposited for aluminum than for steel so that a lower amount of energy is introduced into the work piece 16.

Certainly, a polarity change of the welding current I can also be triggered by indicating the number of pulses and/or periods 40, 41 or by presetting or defining a duration or by a trigger signal.

Of course, it is possible that the individual adjustment possibilities described above are combined with each other and/or that several adjustment possibilities are provided on the welding apparatus 1.

The invention claimed is:

1. A method for controlling and regulating a welding apparatus and a welding current source, respectively, with a welding wire, wherein after ignition of an electric arc, a cold metal transfer (CMT) welding process is conducted, comprising the steps of:
   conveying a welding wire into the direction of the work piece until said welding wire contacts the work piece,
   reversing the direction of movement of the welding wire away from the work piece subsequently, after formation of a short circuit, during a short-circuit phase, and until opening of the short circuit,
   controlling at least one of a welding current I or a welding voltage (U) such that the welding wire melts on the workpiece, during an electric-arc phase,
   switching a polarity of a welding current I and a welding voltage U directly between positive and negative with a zero crossing during at least one short-circuit phase, wherein the current and voltage do not remain at zero for any measurable period of time and wherein the reversal of polarity is coordinated with forward movement and reverse movement of the welding wire,
   adjusting at least one of the amplitude of the welding current I and the welding voltage U to a defined value to prevent a melting-through of the welding wire and the short-circuit bridge, respectively,
   providing a safe re-ignition of the electric arc when lifting the welding wire off the work piece,
   by re-igniting the electric arc by at least one of the welding current and the welding voltage U without any auxiliary voltage, at the end of said short-circuit phase or at the beginning of the electric-arc phase,
   wherein polarity of at least one of the welding current I and the welding voltage U is switched after each period which is formed by one short-circuit phase and one electric-arc phase, such that a negative portion of the welding current I causes a reduction in temperature of a heat-affected zone of the workpiece,
   wherein the welding wire moves in an oscillating way during the welding process,
   wherein the welding wire is conveyed in a backwards direction during the short circuit phase,
   wherein the point in time of switching polarity of the welding current I or the welding voltage U with respect to the short-circuit phase is defined by the control device on the basis of at least one welding parameter.

2. The method according to claim 1, wherein said step of controlling comprises increasing the welding current I during the electric-arc phase to create a melting-on of the end of the welding wire.

3. The method according to claim 1, wherein said step of controlling comprises increasing the welding current I during the short-circuit phase, wherein, during the step of increasing the welding wire current I, the filler material formed by the welding wire is introduced into the melting bath of the work piece and, during a step of reducing the welding wire I, less filler material is introduced into the melting bath of the work piece.

4. The method according to claim 1, wherein said step of reversing a direction of the welding wire occurs after formation of a short circuit, the wire-conveying direction is reversed and the welding wire is moved away from the work piece until there is a freely selectable or predefined distance.

5. The method according to claim 1, wherein polarity of the welding current I or the welding voltage U is switched after several periods with each period formed by one short-circuit phase and one electric-arc phase.

6. The method according to claim 5, wherein polarity of the welding current I or the welding voltage U is switched after a predefined or adjustable number of periods.

7. The method according to claim 5, wherein polarity of the welding current I or the welding voltage U is switched periodically or irregularly after a changeable or variable number of periods.

8. The method according to claim 7, further comprising the step of automatically determining the point in time of switching polarity of the welding current I or the welding voltage U ion the basis of at least one welding-process parameter which has been adjusted prior to the welding process or detected during the same, wherein said parameter comprises at least one of a welding current I, a parameter for heat introduction, a material composition of the work piece, a material composition of the welding wire a type of protective gas used or a welding gap in the work piece.

9. The method according to claim 1, wherein the at least one welding parameter is manually selected and adjusted on the welding apparatus.

10. The method according to claim 1, wherein switching polarity of the welding current I or the welding voltage U is triggered on the basis of a predefined period or by a trigger signal.

11. The method according to claim 1, wherein the feed rate V of the welding wire is changed and determined on the basis of the polarity of the welding current I or the welding voltage U.

12. The method according to claim 1, wherein during a period formed by a short-circuit period and an electric-arc phase, polarity of the welding current I or the welding voltage is at least twice controlledly switched, wherein, in particular, a polarity change occurs during the electric-arc phase and during the short-circuit phase.

13. The method according to claim 12, wherein the timely controlled polarity switch of the welding wire I or the welding voltage U during a period is controlled on the basis of welding-process parameters, comprising at least one of: a parameter of heat introduction, a welding current I, a welding voltage U, a parameter of material introduction.

14. The method according to claim 1, wherein the amplitude or polarity of the welding current I or the welding voltage U is regulated on the basis of a width or a height of a gap detected between the work pieces to be welded.

15. The method according to claim 1, wherein an amplitude or polarity of the welding current I or the welding voltage U is regulated on the basis of a depth of the weld penetration detected, in particular of the so-called welding root.

16. A welding apparatus comprising:
   a welding current source,
   a welding torch,
   a wire feeding device, an input or output device comprising a remote control for adjusting the different welding parameters and for adjusting and selecting at least one parameter for heat balance or heat introduction into the work piece to be processed, a controller associated with the remote control input or output device, said controller being configured to define the points in time of a polarity change of the welding current I or the welding voltage U after each period which is formed by one short-circuit phase and one electric-arc phase, on the basis of the at least one adjusted or selected parameter for heat balance or heat introduction, the polarity change occurring with a zero crossing such that the current and voltage do not remain at zero for any measurable period of time, and at least one adjuster in communication with said controller, said adjuster configured to control the amplitude of the welding current I and the welding voltage U to a defined value to prevent a melting-through of the welding wire and the short-circuit bridge, respectively, wherein the controller is adapted to move the wire feeding device such that the wire moves in an oscillating way during the welding process, and is conveyed in a backwards direction during the short circuit phase, and wherein the polarity change is coordinated with forward movement and reverse movement of the wire.

17. The welding apparatus according to claim 16, wherein said at least one adjuster is arranged for directly or indirectly adjusting the number or duration of the periods of the welding current I or the welding voltage U with positive or negative polarity.

18. The welding apparatus according to claim 16, further comprising a memory for depositing welding-parameter settings, particularly AC curve shapes, period durations for said welding current I, or the welding voltage U.

19. The welding apparatus according to claim 16, wherein said controller is formed by a software and program logic, respectively, deposited in the data memory of the control device, said data memory being connected with the input or output device for changing or calling the data stored in said memory.

* * * * *